though only approximately. This is done by means of the following phasing device.

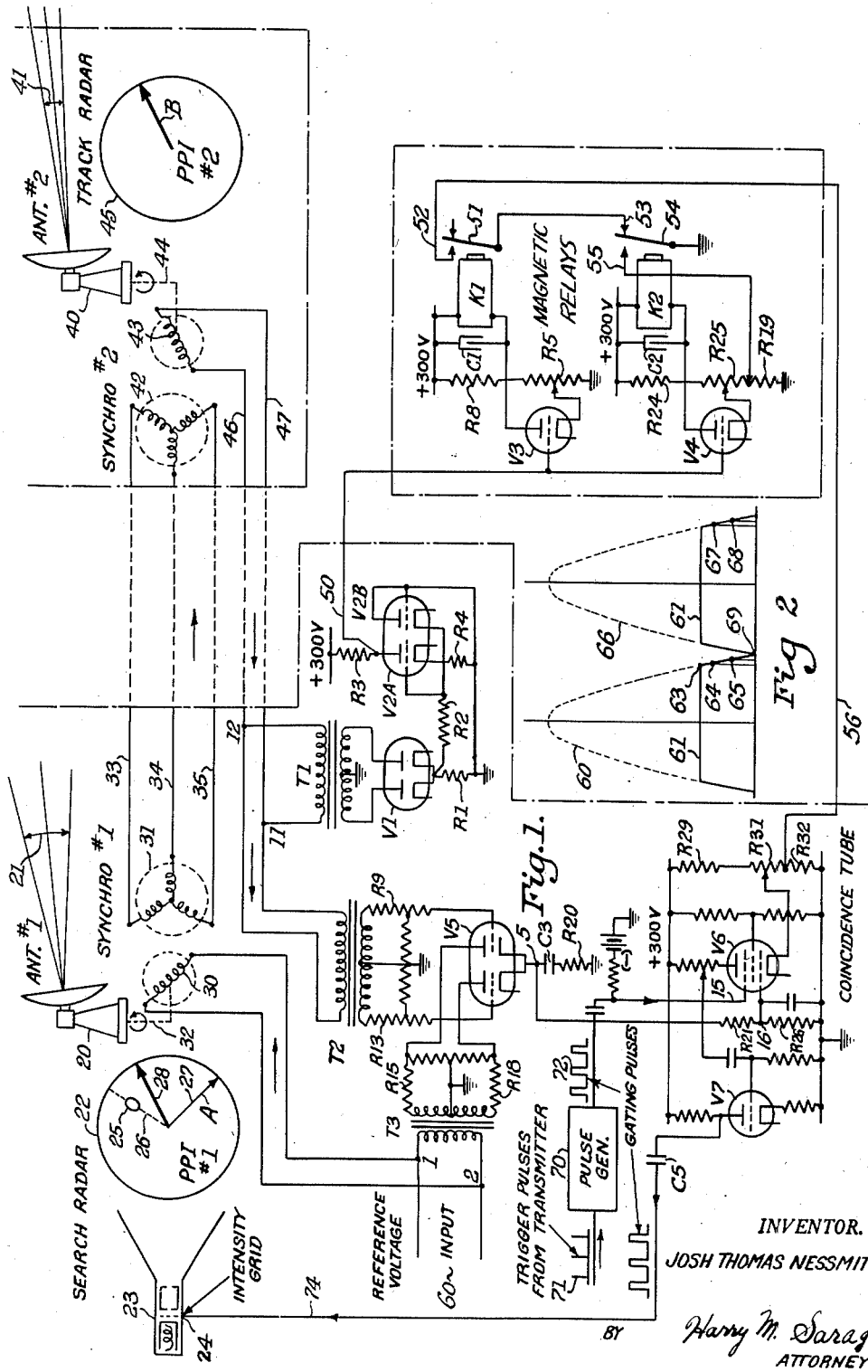

United States Patent Office 2,776,421
Patented Jan. 1, 1957

2,776,421

ANTENNA COINCIDENCE INDICATOR

Josh T. Nessmith, Jr., Haddonfield, N. J., assignor to the United States of America as represented by the Secretary of the Army Application February 21, 1955, Serial No. 489,820

3 Claims. (Cl. 343—5)

This invention relates to radar systems and particularly to means for quickly locating a moving target such as a fast moving airplane. In the operation of such systems experience has shown that two distinct types of radar sets are desirable, one for search for possible targets and another for tracking automatically a target when found. The first of these is commonly called a search radar and is designed with a relatively broad radio beam and only a moderately high radiation frequency. Its broad radio beam adapts it to pick up targets readily. The second type is designed with a narrow radio beam and operates at much higher frequencies, and is suitable for automatically following or tracking a moving target and for providing a continuous flow of target position data for the use of anti-aircraft gunners. Some radar sets have been designed with the two distinct systems, built together on the same mounting, as for example, the well known radar set SCR545 described in War Department Manual TM 11–1527.

In the system according to the present invention, the search and track radar sets are physically separate and independent. The two sets are located not far from each other and each set has its own operators. The search radar set is used to pick up and locate a target. It may revolve continuously at some 20 R. P. M. while the track radar may be at rest or rotating slowly as desired. Means are provided on the two sets whereby the electron beam of the plan position indicator (P. P. I.) of the search radar is momentarily unblocked at the instant the azimuth of the search radar beam coincides in direction with that of the track radar. This provides a luminous radial trace on the face of the indicator showing the search operator the present position of the track radar beam. Since the position of the target already located is also visible on the face of the indicator, the search operator can see how far the azimuth of the track radar is off the target. By selsyn means, not part of this invention, the search operator may now move manually the azimuth of the track radar beam until the luminous radial line on his P. P. I. indicator passes through the target spot. The track radar azimuth then coincides with that of the target and it remains only for the track operator to vary the elevation of his radar beam until he picks up the target located by the search operator. As soon as the track operator picks up the target, he takes over the operation of his set in tracking the target.

In the development of the system described herein the use of a synchro receiver at the search radar to indicate the azimuth position of the track radar beam was rejected because of its inaccuracy in view of the close operating requirements. The device according to the invention not only meets the accuracy requirements but also utilizes the existing P. P. I. indicator on the search radar as a basic component which by showing the position of a target and the instantaneous position of the track radar beam simultaneously on the same screen greatly facilitates the rapid alignment of the track radar beam on the target.

It is an object of the invention to provide a device which will indicate on the face of the P. P. I. indicator of a local radar set the instantaneous azimuth position of the radio beam of an associated nearby radar set.

To accomplish this result the invention provides a synchro device at the associated radar set mechanically coupled thereto, and a second synchro device at the local radar set coupled mechanically thereto and coupled electrically in cooperative relation to said first mentioned synchro.

Another object of the invention is to provide a phasing device to automatically avoid the ambiguity arising in the use of two synchro devices in cooperative relation where two positions are possible and only one of which is desired.

The invention will now be described in detail with reference to the accompanying drawings wherein:

Fig. 1 is a diagrammatic representation of the equipment required at the search radar set together with the cooperating apparatus required at the track radar set.

Fig. 2 is a diagram used in explanation of one feature of the system.

Referring now to Fig. 1, the apparatus and its operation will be described in detail.

Numeral 20 indicates the radio antenna or beam projector of the search radar set having the relatively wide angle radio beam 21. Numeral 22 indicates diagrammatically the face of the P. P. I. cathode ray indicator with a target at 25 having the azimuth position indicated by dotted radial line 26. Radial line A represents the instantaneous azimuth position of the axis of the search radar beam revolving for example counterclockwise at 20 R. P. M. Numeral 23 indicates generally the cathode ray tube of the P. P. I. having the conventional elements including an intensity grid 24. Numerals 30 and 31 represent respectively the rotor and stator of a conventional synchro #1, the rotor being driven from the search radar antenna by mechanical connection indicated by dotted line 32.

The equipment on the track radar set used in cooperative relation with that provided on the search radar set is identified as follows. Numeral 40 indicates the radio antenna projector having the narrow radio beam 41 required for automatic tracking and operates at frequencies of the order of 3000 to 10,000 megacycles. The stator and rotor of the receiving and re-transmitting synchro is indicated by numerals 42 and 43 respectively. The rotor 43 is driven from the vertical axis of antenna 40 by mechanical connection 44. The stators of synchros #1 and #2 are connected conventionally by wires 33, 34, and 35. The face of the track radar P. P. I. indicator is indicated by numeral 45. The radial trace of the electron beam of the indicator is represented by the letter B and gives the azimuth bearing of the radar beam.

The rotor of synchro #1 is excited from a 60 cycle reference voltage applied to input terminals 1 and 2 as shown. The voltages induced by transformer action in the three section winding of the stator are transmitted by the three wire transmission line 33, 34, 35 to the stator of synchro #2 where a resultant magnetic field is generated having an axial direction parallel to that of synchro #1 as is well known in the art. The 60 cycle voltage induced in the winding of rotor 43 varies with its angular position relative to the axis of the magnetic field of the stator and becomes zero when the rotor is positioned at right angles to said magnetic axis. In the system described it is preferred to align the rotor of synchro #2 so that its induced voltage is zero or approaching zero when the axes of antennas #1 and #2 are parallel.

The output voltage of synchro #2 is transmitted back to the search radar set by wires 46 and 47 to junctions 11 and 12 where it is applied to the primary windings of transformers T1 and T2 respectively. The output of T1 is rectified by the double diode V1 which establishes a potential to ground across resistor R1. This D. C. output voltage pulsating at twice the carrier rate which varies with the envelope of the 60 cycle positioning voltage induced in the rotor of synchro #2, is applied to the grid of triode V2A through resistor R2 to clip the peaks off the rectified envelope as shown at 61 of Fig. 2, the purpose of which will be explained later. The anode and grid of triode V2B are connected together and grounded as shown and the cathode connected to the grid of V2A to prevent it going negative.

The plate output of amplifier V2A is applied to the grids of triodes V3 and V4 by wire 50 which provides the input to magnetic relays K1 and K2 respectively. The windings of these relays are connected between the respective anodes and the source of voltage which may be for example +300 volts as shown. Suitable condensers C1 and C2 are shunted across the inductive magnet windings to bypass sudden current peaks. The cathode of V3 is biased positively by a potentiometer tap on resistor R5 energized from +300 v. through R8. The cathode of V4 is similarly biased positively by a potentiometer tap on resistor R25. The bias of V4 is however, a little greater than that of V3 so that relay K1 picks before relay K2.

Referring now to Fig. 2, the dotted curves 60 and 66 represent the envelope of the successive half waves of the rectified voltage appearing across cathode resistor R1, while the horizontal lines 61 represent the envelope of the voltage applied to the grid of V2A clipped by grid resistor R2. During the declining part of voltage wave 60 the plate current and potential remain substantially constant until point 63 is reached. Further decline reduces the plate current through resistor R3 in consequence of which the plate voltage rises rapidly. This voltage is applied to the grids of triodes V3 and V4 through conductor 50. When the rising grid potential exceeds the blocking bias of V3 the tube rapidly becomes conductive and causes the armature 51 of relay K1 to pick up, closing contact 52. This short circuits resistor R32 of the coincidence tube V6 through wire 56, contact 52, armature 51 of K1 and contact 53 and armature 54 of relay K2.

Coincidence tube V6 is normally biased beyond cut off by R32 and potentiometer R31, but becomes conductive when R32 is shorted, provided its control grid is biased sufficiently positive to overcome the cathode bias of R31, and provided also that its grid #3 is also sufficiently positive. This last condition is effected by positive gating pulses 72 of pulse generator 70 which is triggered by timing pulses 71 from radar set #1. Pulse generator 70 may be a monostable multivibrator well known in the art. Under these conditions, when relay K1 picks up at some point 64 of Fig. 2, gating pulses 72 are passed through coincidence tube V6 to the grid of amplifier V7, whence they pass through condenser C5 and wire 74 to intensity grid 24 of P. P. I. indicator tube #1. These gating pulses, as stated above, unblock the electron beam during each radar range sweep and provide thereby the luminous radial line 28 on the face of the indicator tube.

When the grid voltage of V2A declines a little further say to point 65 of Fig. 2, triode V4 becomes conductive and causes relay K2 to pick up armature 54 which breaks contact 53 thereby opening the short across R32 of the coincidence tube, and interrupting the flow of gating pulses to intensity grid 24 of the indicator tube. The electron beam is thereby cut off and does not follow the rotation of antenna #1. The illumination of the beam is limited narrowly to the trace 28, the width of which is determined by the angular separation of points 64 and 65 of Fig. 2. Thus, the luminous line is limited sharply to the coincidence in azimuth of antenna #1 and antenna #2. When relay K2 picks up, contact 55 is closed thereby shorting biasing resistor R19 which prevents K2 releasing before K1. This arrangement requires that for operation of the unit the input voltage to terminals 11 and 12 must be decreasing and allows a wide range of selection of the input voltage at which K1 and K2 will operate. The circuit is unique in that it offers a means of lower error indexing by using a modulated AC voltage where the modulation frequency is not small as compared with the carrier frequency. The circuits used do not introduce a large enough phase shift of the modulation envelope or the carrier frequency to cause errors with a change in modulation frequency. Such changes could occur with a change in antenna loading of the search radar or changes in speed of the aforementioned tracking radar. Since the relays K1 and K2 are sensitive D. C. relays of low resistance coil windings, and since capacitors C1 and C2 offer low impedance paths to sudden changes in currents and the inductances of the relays K1 and K2 offer a high impedance to sudden current changes, the relays operate at an average D. C. current level determined by the modulation envelope. Since the time constants of the system are small as compared with the modulation envelope frequency, there is a minimum of phase shift of the modulation envelope. Therefore, with a change in modulation frequency there is a minimum of phase shift and therefore less error is caused by modulation frequency changes.

It will be seen that as the rotor of synchro #1 revolves, a series of rectified half waves is generated as shown in Fig. 2. The antenna axes coincide during one of these half waves and not during the other. Some means must be provided for distinguishing between the half waves giving antenna coincidence and those which do not. This is accomplished by the phasing circuit shown in Fig. 1 which includes transformers T2 and T3 and twin triode V5. Transformer T2 is excited by the rotor by synchro #2 from terminals 11 and 12 in parallel with T1. The mid point of the secondary of T2 is grounded while the ends of the winding are connected to the respective grids of twin triode V5 through suitable resistors R9 and R13 as shown. Transformers T3 is excited from the 60 cycle reference voltage at terminals 1 and 2 while its secondary, whose mid point is grounded, is connected through suitable resistors R15 and R18 to the respective anodes of V5. The common cathode junction 5 is conductively connected to ground through resistors R21 and R26, the junction 16 being connected to the control grid of V6. The common cathode junction 5 is also connected to ground through condenser C3 and cathode resistor R20.

It will be seen from the circuits just described that when the voltages of synchro rotors 30 and 43 are in phase, that the voltages applied to the corresponding anodes and grids of twin triode V5 are also in phase. The triodes are therefore alternately conducting during each half cycle of the reference voltage. The rectified output from the cathodes at point 5, passing to ground via R21 and R26 provides the necessary positive bias at the control grid of V6 to overcome the positive bias of the cathode by R31 when R32 is shorted to make V6 conductive. With this phase relation the active half cycle 60 of the rectified wave envelope Fig. 2 is selected by the phasing circuit to pass the gating pulses to the indicator of the search radar set during the interval 64—65 when the direction of the two antennas coincide.

When the rotor of synchro #1 revolves beyond the zero point 69 the phase of the voltages induced in synchro rotor #2 are reversed with respect to the reference voltage of transformer T3 which supplies the plate voltage excitation to twin triode V5. Thus the voltages applied to the plates and grids of V5 are always in phase opposition during the generation of rectified wave envelope 66 and notwithstanding the operation of the gating relays K1 and K2 during the interval 67—68, the gating pulses from pulse generator 70 are prevented from passing through the coincidence tube V6 by the failure of the positive bias on its control grid. Thus the phasing circuit prevents the appearance of electron trace 28 except when the two antennas are accurately in line.

The purpose of clipping the peak of rectified wave envelopes 60 and 66 by grid resistor R2 of V2A will now be apparent. It is seen that the full range of the tube is limited to the steep part of the sine curve points 63 to 69 and extending over only a small part of the 180° of azimuth swept through by the synchro rotor. In this way the operating interval 64—65 is confined to a correspondingly small azimuth interval.

The details, system connections, and components of the system according to the invention having been described, the operation as a whole will now be described.

Assuming the search radar antenna to be revolving continuously while the track radar antenna is at rest with its operating crew standing by, the rotor of synchro #1 induces a modulated 60 cycle voltage in the rotor winding of synchro #2. The amplitude of the 60 cycle carrier reference voltage induced in rotor #2 rises and falls with the rotation of antenna #1 passing through a maximum twice during each revolution and also through zero, constitutes a 60 cycle carrier modulated 100% at the frequency of rotation of antenna #1. This modulated voltage is rectified by diode V1 giving the wave envelope 60 and 66 of Fig. 2 whose amplitude is clipped by grid resistor R2. During the declining part of the phase concurrent half cycle 60, relay K1 short circuits bias resistor R32 of coincidence tube V6 at instant 64. During this half cycle 60 cycle voltage from synchro #2, in phase agreement with the reference voltage, passes through V5 and provides a positive bias for the control grid of V6. This condition which renders V6 conductive, passes gating pulses from pulse generator 70 to the intensity grid of P. P. I. indicator #1 providing thereby a luminous radial electron trace 28 on the face of the indicator giving the azimuth bearing of antenna #2. An instant later, at point 65 the action of relay K2 cuts off the electron beam by interrupting the short circuit across bias resistor R32. Thus the azimuth position of antenna #2 is illuminated briefly once during each revolution during interval 64—65.

The search radar operator, seeing the position of the track radar antenna on the face of his indicator together with luminous spot 25 indicating the position of a selected target, moves the azimuth of antenna #2 by moving a control handwheel on his set selsyn connected to antenna #2 (not part of the invention) until the electron trace B passes through target spot 25. At this point track radar operator varies the elevation of his antenna until target 25 is picked up on his P. P. I. indicator, whereupon the crew of the track radar set take over and track the target selected by the search operator providing a continuous flow of target data for use by anti-aircraft gunners.

The utility of the invention lies in the rapidity and accuracy with which the track radar set can be made to pick up a desired target.

Having described my invention so that it may be practiced by those skilled in the art, what I claim is:

1. A device including a plan position indicator of a first radar set to indicate the position of bearing coincidence with a second radar set comprising, a synchro device connected to the antenna of each radar set with connecting wires between the stators thereof, a source of reference voltage and connections therefrom to the rotor of one of said synchros, means for rectifying the position modulated voltage output of the other synchro, a coincidence tube having preferred electrodes biased beyond cut-off, means to unblock one of said biased electrodes to render the coincidence tube potentially conductive during a predetermined small azimuth angle, a connection from the output of the coincidence tube to the intensity grid of said indicator tube, and a source of gating pulses derived from said first radar set connected to another of said biased electrodes, whereby said gating pulses are applied to said intensity grid to produce a luminous radial line on the face of the indicator at the position where the azimuths of the two radar sets coincide; said means for unblocking including, amplifier means connected to amplify said rectified position modulated output voltage and having a suitable high resistance in its grid input circuit to clip the applied grid voltage, a pair of triodes having grids connected to the plate of said amplifier and having cathodes biased beyond cut-off when said amplifier is fully conductive, a pair of magnetic relays having windings connected in series with said triodes respectively, the first of said relays being adjusted to pick up when said amplifier grid voltage falls to a predetermined point on the steep part of said rectified voltage output wave, contacts on the first relay when actuated connected to short circuit a biasing resistor to render said coincidence tube potentially conductive, contacts on the second relay when actuated connected to open said short circuit when said amplifier grid voltage has fallen still further to a second predetermined point, whereby said coincidence tube is rendered conductive during said predetermined small azimuth angle.

2. A device including the plan position indicator of a first radar set to indicate the position of bearing coincidence with a second radar set comprising, a synchro device connected to the antenna of each radar set with connecting wires between the stators thereof, a source of reference voltage and connections therefrom to the rotor of one of said synchros, means for rectifying the position modulated voltage output of the other synchro, a coincidence tube having preferred electrodes biased beyond cut-off, means to unblock one of said biased electrodes to render the coincidence tube potentially conductive during a predetermined small azimuth angle, a connection from the output of the coincidence tube to the intensity grid of said indicator tube, and a source of gating pulses derived from said first radar set connected to another of said biased electrodes, whereby said gating pulses are applied to said intensity grid to produce a luminous radial line on the face of the indicator at the position where the azimuths of the two radar sets coincide; and means for avoiding ambiguity of antenna position signals including, a pair of triodes, a first transformer having a primary excited by the position modulated output of said synchros and a secondary having its midpoint grounded and its output terminals connected to the respective grids of said triodes through suitable grid resistors, a second transformer having a primary excited by said reference voltage and a secondary having its mid-point grounded and its output terminals connected to the respective plates of said triodes through suitable plate resistors, a resistor having an intermediate tap thereon connected from the cathodes of said triodes to ground, and a connection from the control grid of said coincidence tube to said intermediate tap, whereby when the output voltage of said synchros is in phase with the reference voltage the respective anodes and grids of said triodes are in phase and provide a positive biasing potential rendering the coincidence tube potentially conducting when the direction of the radar beams coincide and non-conducting when they oppose.

3. A device including the plan position indicator of a first radar set to indicate the position of bearing coincidence with a second radar set comprising, a synchro device connected to the antenna of each radar set with connecting wires between the stators thereof, a source of reference voltage and connections therefrom to the rotor of one of said synchros, means for rectifying the position modulated voltage output of the other synchro, a coincidence tube having preferred electrodes biased beyond cut-off, means to unblock one of said biased electrodes to render the coincidence tube potentially conductive during a predetermined small azimuth angle, a connection from the output of the coincidence tube to the intensity grid of said indicator tube, and a source of gating pulses derived from said first radar set connected to another of said biased electrodes, whereby said gating pulses are applied to said intensity grid to produce a luminous radial line on the face of the indicator at the position where the azimuths of the two radar sets coincide; and phasing means to avoid ambiguity in said directional indications including a concidence tube having at least three electrodes, at least one of which is biased beyond cut-off, a transformer having a primary excited from said reference voltage, a second transformer having a primary excited by the position modulated output of said synchros, a thermionic tube having at least a cathode, anode and control grid, connections from the secondary of one transformer to said control grid, connections from the secondary of the other transformer to said anode, a tapped resistor connecting said cathode to ground, and a connection from said resistor tap to a biased electrode of said coincidence tube, whereby the coincidence tube is potentially conductive when said output synchro voltage is in phase with the reference voltage and nonconductive when in phase opposition.

References Cited in the file of this patent
UNITED STATES PATENTS

| | | |
|---|---|---|
| 2,572,975 | Berger et al. | Oct. 30, 1951 |
| 2,634,412 | Meagher | Apr. 7, 1953 |

OTHER REFERENCES

Cathode Ray Tube Displays (M. I. T. Rad. Lab. Series, vol 22) by T. Soller, M. A. Starr, G. E. Valley, pages 230–233, McGraw-Hill Book Co., Inc., New York, N. Y., 1948.